United States Patent
Han (10) Patent No.: US 12,025,524 B2
(45) Date of Patent: Jul. 2, 2024

(54) TORQUE SENSOR APPARATUS

(71) Applicant: HL MANDO CORPORATION, Pyeongtaek-si (KR)

(72) Inventor: Hyunsik Han, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 208 days.

(21) Appl. No.: 17/672,115

(22) Filed: Feb. 15, 2022

(65) Prior Publication Data
US 2022/0260443 A1 Aug. 18, 2022

(30) Foreign Application Priority Data
Feb. 16, 2021 (KR) .................. 10-2021-0020757

(51) Int. Cl.
*G01L 5/22* (2006.01)
*B60R 16/02* (2006.01)
*B62D 3/12* (2006.01)
*B62D 5/04* (2006.01)

(52) U.S. Cl.
CPC .......... *G01L 5/221* (2013.01); *B60R 16/0207* (2013.01); *B62D 3/126* (2013.01); *B62D 5/0481* (2013.01)

(58) Field of Classification Search
CPC ..... G01L 5/221; B60R 16/0207; B62D 3/126; B62D 5/0481
See application file for complete search history.

(56) References Cited

U.S. PATENT DOCUMENTS

| 4,885,944 | A | * | 12/1989 | Yagi | G01L 3/105 |
| | | | | | 73/862.335 |
| 8,960,364 | B2 | * | 2/2015 | Ji | F16H 19/04 |
| | | | | | 180/443 |
| 9,683,873 | B2 | * | 6/2017 | Lee | B29C 45/00 |
| 9,731,749 | B2 | * | 8/2017 | Kim | B62D 5/0403 |
| 2019/0195709 | A1 | * | 6/2019 | Ohnishi | G01L 5/221 |

FOREIGN PATENT DOCUMENTS

| CN | 115087579 A | * | 9/2022 | ........ B60R 16/0215 |
| DE | 102012005130 A1 | * | 9/2013 | ........ H02G 3/0616 |
| JP | 3608634 B2 | * | 1/2005 | |
| JP | 2012016994 A | * | 1/2012 | |
| JP | 2019104439 A | * | 6/2019 | |
| KR | 20160044771 A | * | 4/2016 | |
| KR | 20170088175 A | * | 8/2017 | |
| KR | 20190046570 A | * | 5/2019 | |
| KR | 20220134798 A | * | 10/2022 | |

* cited by examiner

*Primary Examiner* — Octavia Davis Hollington
(74) *Attorney, Agent, or Firm* — Hauptman Ham, LLP (57) ABSTRACT

A torque sensor apparatus includes a torque sensor; a sensor accommodation unit disposed at one side of a rack housing and having therein a space in which the torque sensor is disposed; a sensor cover screw-coupled to the sensor accommodation unit and configured to cover the space; and a wire harness coupled to the sensor cover and electrically connected to the sensor.

9 Claims, 6 Drawing Sheets

TORQUE SENSOR APPARATUS

CROSS-REFERENCE TO RELATED APPLICATIONS

This application claims benefit and priority to Korean Patent Application No. 10-2021-0020757, filed on Feb. 16, 2021, with the Korean Intellectual Property Office, the disclosure of which is incorporated herein in its entirety by reference.

TECHNICAL FIELD

The present disclosure relates to a torque sensor apparatus, and more particularly, to a torque sensor apparatus capable of being easily assembled.

BACKGROUND

In general, a steering system for a vehicle includes a steering shaft configured to provide a rack gear with a rotational force of a steering wheel disposed in a driver seat, and a rack bar having the rack gear and configured to be rectilinearly moved by the rotational force of the steering shaft.

An outer peripheral surface of the rack bar is surrounded by a rack housing. A torque sensor configured to detect the rotational force of the steering shaft is disposed at one side of the rack housing. A sensor cover may protect the torque sensor from outside foreign substances.

SUMMARY

The present disclosure has been made in an effort to provide a torque sensor apparatus capable of protecting a torque sensor and be easily assembled.

A torque sensor apparatus according to various embodiments of the present disclosure may include a sensor accommodation unit disposed at one side of a rack housing and having therein a space in which a torque sensor is disposed, a sensor cover screw-coupled to the sensor accommodation unit and configured to cover the space, and a wire harness coupled to the sensor cover and electrically connected to the sensor.

The sensor accommodation unit may include: a seating portion on which the torque sensor is provided; and a wall portion protruding along a periphery of the seating portion and configured to define the space, and in which a first screw thread is formed on the wall portion and screw-coupled to the sensor cover.

The first screw thread may be formed on an inner peripheral surface of the wall portion.

The sensor cover may have a dome shape and include a coupling portion having a second screw thread screw-coupled to the first screw thread.

The second screw thread may be formed on an outer peripheral surface of the coupling portion.

The sensor cover may include a flange portion disposed to overlap an end surface of the wall portion in an upward/downward direction in a state in which the coupling portion is screw-coupled to the wall portion.

The torque sensor apparatus may include a sealing member disposed between an upper-end surface of the wall portion and the flange portion.

The sensor cover may have a through-hole, and a connector of the wire harness may penetrate the through-hole.

The through-hole may be formed coaxially with a rotation axis about which the sensor cover rotates relative to the sensor accommodation unit.

The seating portion may have a pinion hole, and a pinion shaft may penetrate the pinion hole.

The wire harness may be coupled to the sensor cover by means of a wire cover, and the wire cover may include a first fixing portion fixedly coupled to the sensor cover by means of a coupling member, and a second fixing portion rotatably connected to the first fixing portion.

The torque sensor apparatus according to various embodiments of the present disclosure does not require a separate fastening member used to couple the sensor cover to the sensor accommodation unit. Therefore, it is possible to simplify the components and reduce the manufacturing cost.

Since the sensor cover is coupled to the sensor accommodation unit in a screw-coupling manner, the manufacturing process may be easily performed, and the manufacturing time may be reduced.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, for convenience of description, some embodiments of the present disclosure will be described in detail with reference to the illustrative drawings. In giving reference numerals to constituent elements of the respective drawings, the same constituent elements will be designated by the same reference numerals, if possible, even though the constituent elements are illustrated in different drawings.

Terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term in order to describe his/her own invention by the best method. In addition, the terms first, second, A, B, (a), and (b) may be used to describe constituent elements of the embodiments of the present disclosure. These terms are used only for the purpose of discriminating one constituent element from another constituent element, and the nature, the sequences, or the orders of the constituent elements are not limited by the terms. When one constituent element is described as being "connected" or "coupled" to another constituent element, it should be understood that one constituent element can be connected or attached directly to another constituent element, and an intervening constituent element can also be "connected" or "coupled" to the constituent elements.

Therefore, the embodiments disclosed in the present specification and the configurations illustrated in the drawings are just the best preferred embodiments of the present disclosure and do not represent all the technical spirit of the present disclosure. Accordingly, it should be appreciated that various equivalents and modified examples capable of substituting the embodiments may be made at the time of filing the present application. In addition, detailed descriptions of publicly-known functions and configurations, which may unnecessarily obscure the subject matter of the present disclosure, will be omitted.

Hereinafter, a direction from a seating portion, on which a sensor is installed, to a sensor cover will be described as an up or upward direction, and a direction opposite to the up or upward direction will be described as a down or downward direction.

Hereinafter, a torque sensor apparatus according to various embodiments of the present disclosure will be specifically described with reference to the accompanying drawings.

Figure 1:
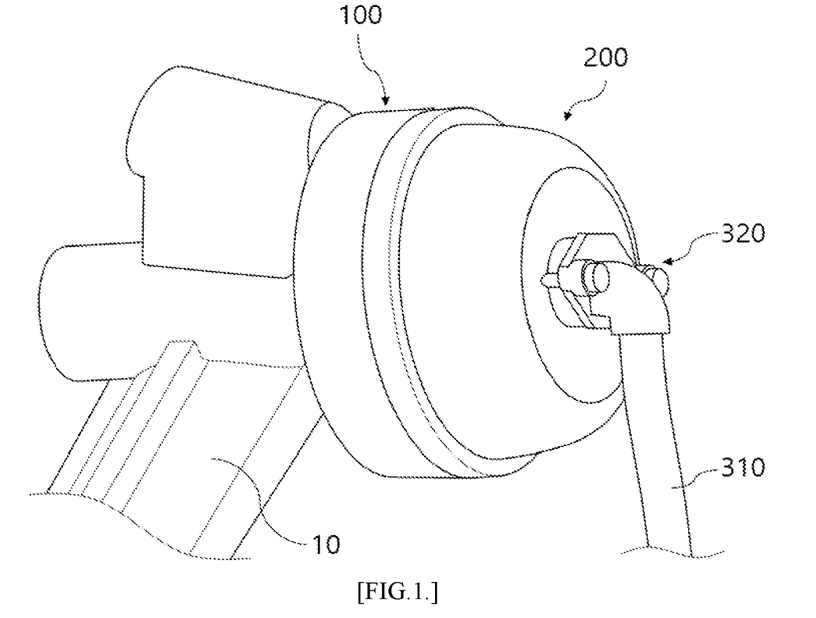
FIG. 1 is a perspective view of a torque sensor apparatus according to various embodiments of the present disclosure.
Figure 2:
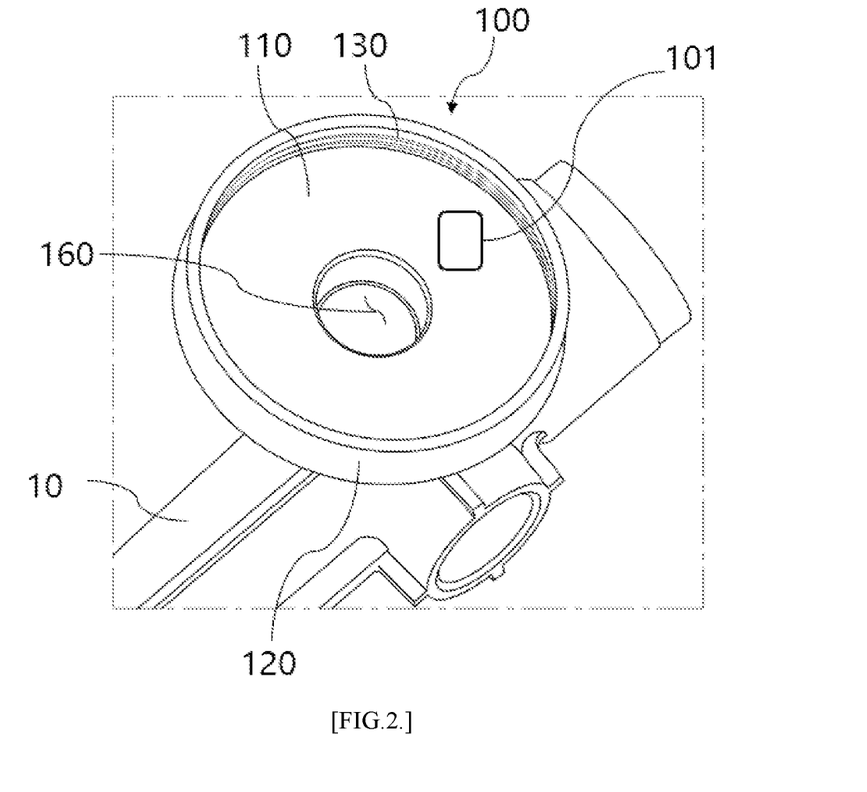
FIG. 2 is a perspective view of a sensor accommodation unit according to various embodiments of the present disclosure.
Figure 3:
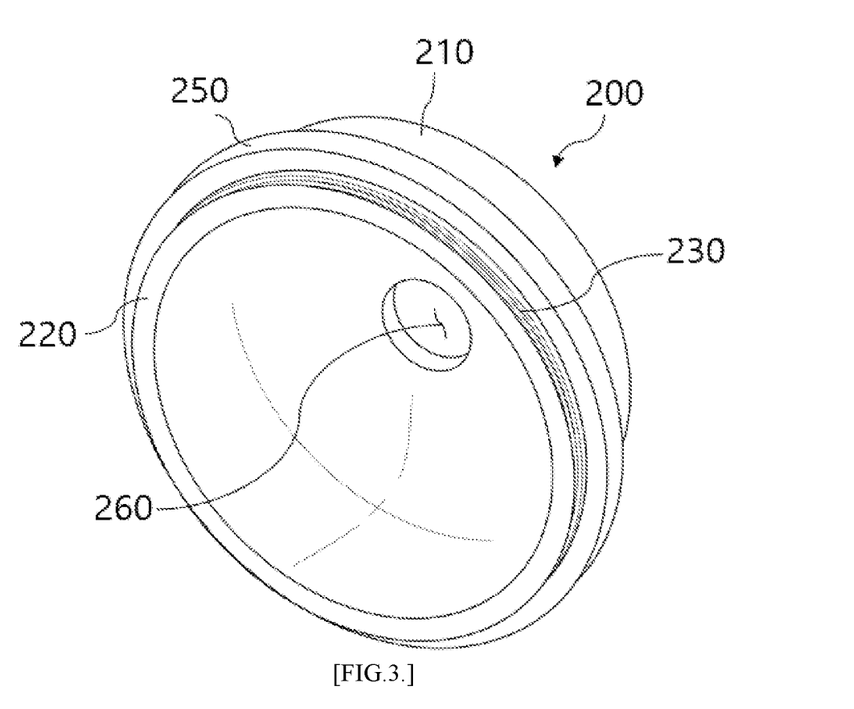
FIG. 3 is a perspective view of a sensor cover according to various embodiments of the present disclosure.
Figure 4:
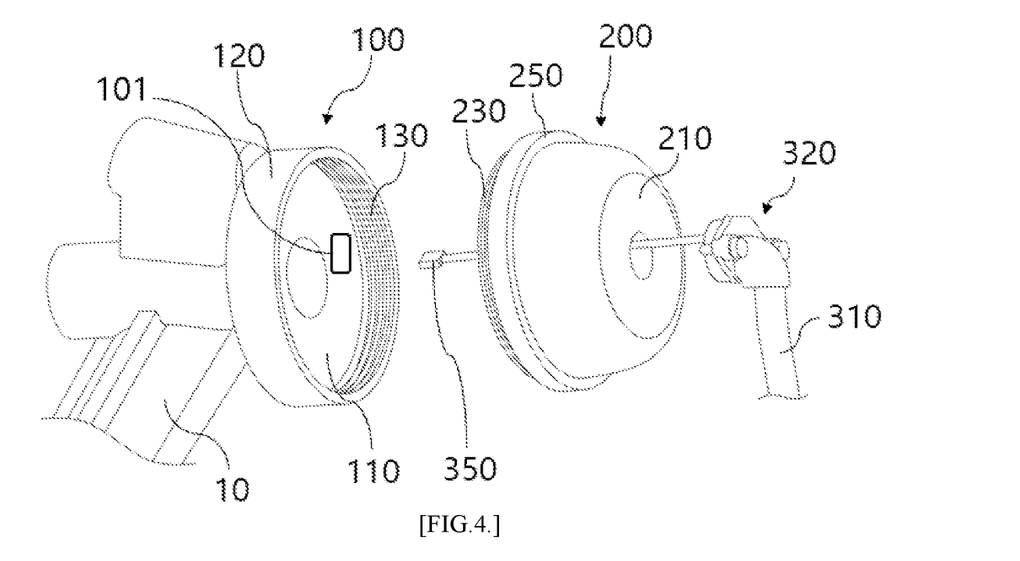
FIG. 4 is an exploded perspective view of the torque sensor apparatus illustrated in FIG. 1.
Figure 5:
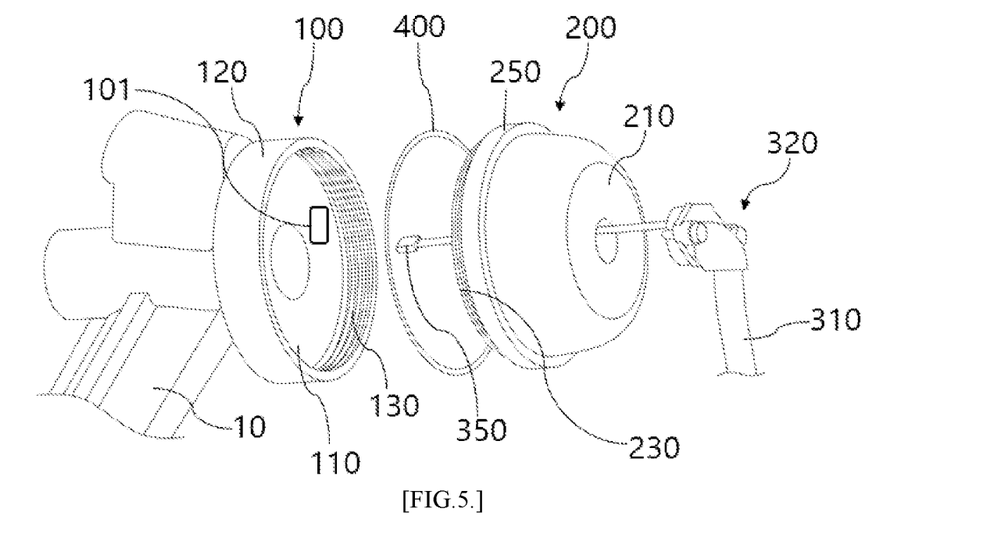
FIG. 5 is an exploded perspective view of the torque sensor apparatus according to the embodiment of the present disclosure.
Figure 6:
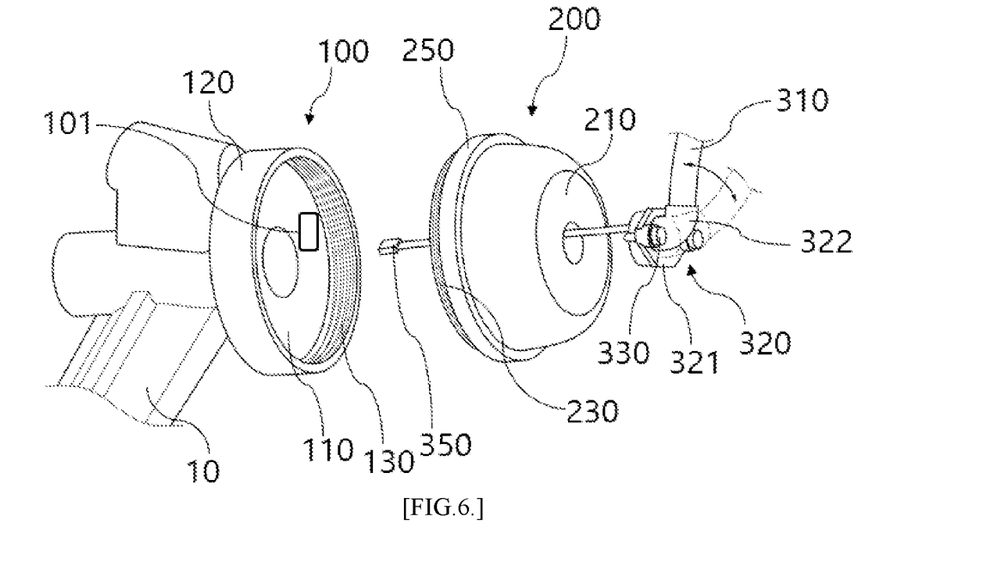
FIG. 6 is an exploded perspective view of a torque sensor apparatus according to another embodiment of the present disclosure.

FIG. 1 is a perspective view of a torque sensor apparatus according to various embodiments of the present disclosure, FIG. 2 is a perspective view of a sensor accommodation unit according to various embodiments of the present disclosure, FIG. 3 is a perspective view of a sensor cover according to various embodiments of the present disclosure, FIG. 4 is an exploded perspective view of the torque sensor apparatus illustrated in FIG. 1, FIG. 5 is an exploded perspective view of the torque sensor apparatus according to the embodiment of the present disclosure, and FIG. 6 is an exploded perspective view of a torque sensor apparatus according to another embodiment of the present disclosure.

Referring to FIGS. 1 to 6, the torque sensor apparatus according to various embodiments of the present disclosure may be easily assembled, thereby improving efficiency of a manufacturing process. The torque sensor apparatus may include a torque sensor 101, a sensor accommodation unit 100, a sensor cover 200, and a wire harness 310.

Referring to FIGS. 1 to 4, the torque sensor apparatus may be structured to protect a torque sensor, which may be installed at one side of the rack housing 10, from outside foreign substances. The sensor may be a torque sensor. However, the present disclosure is not limited thereto, and any publicly-known sensor may be applied.

Referring to FIG. 2, the sensor accommodation unit 100 may be provided at one side of a rack housing 10. The sensor accommodation unit 100 may have therein a space in which the torque sensor 101 is disposed. The sensor accommodation unit 100 may include a seating portion 110 configured to define a bottom surface of the space so that the torque sensor 101 may be seated thereon, and a wall portion 120 provided along a periphery of the seating portion 110 and protruding upward to a predetermined height. The sensor accommodation unit 100 may have an approximately cylindrical shape opened at an upper side thereof. That is, the sensor accommodation unit 100 may have therein the space surrounded by the seating portion 110 and the wall portion 120.

A pinion hole may be formed at one side of the seating portion 110, and a pinion shaft may be disposed in the pinion hole. The torque sensor 101 may be installed on the seating portion 110.

A first screw thread 130 may be formed on the wall portion 120 and screw-coupled to a second screw thread 230 formed on a coupling portion 220 of the sensor cover 200. Referring to FIG. 2, the first screw thread 130 may be formed on an inner peripheral surface of the wall portion 120. In this case, a transverse section of an inner periphery of the wall portion 120 may have a circular shape. However, the shape of the transverse section of an outer periphery of the wall portion 120 is not necessarily limited to a circular shape.

An upper-end surface of the wall portion 120 may overlap a flange portion 250 of the sensor cover 200 in an upward/downward direction when the sensor accommodation unit 100 is coupled to the sensor cover 200.

Referring to FIGS. 3 and 4, the sensor cover 200 may be screw-coupled to the sensor accommodation unit 100 and cover the space in which the sensor is disposed. In the present disclosure, the sensor cover 200 may be coupled to the sensor accommodation unit 100 in a screw-coupling manner without a separate fastening member. Since the sensor cover 200 covers the space, it is possible to prevent the outside foreign substances from entering the space.

In the embodiment, the sensor cover 200 may have an approximately dome shape and include the coupling portion 220, the flange portion 250, and the upper portion 210.

The coupling portion 220 may be formed at a lower end of the sensor cover 200. The sensor cover 200 may be coupled to the sensor accommodation unit 100 in a screw-coupling manner by means of the coupling portion 220. In the embodiment, the coupling portion 220 may have a cylindrical shape. The second screw thread 230 may be formed on the coupling portion 220 and screw-coupled to the first screw thread 130 formed on the wall portion 120 of the sensor accommodation unit 100. In the embodiment, the second screw thread 230 may be formed on an outer peripheral surface of the coupling portion 220.

In the embodiment, the flange portion 250 may overlap the upper-end surface of the wall portion 120 of the sensor accommodation unit 100 in the upward/downward direction when the sensor cover 200 is coupled to the sensor accommodation unit 100. In the embodiment, as illustrated in FIG. 5, a sealing member 400 may be disposed between the upper-end surface of the wall portion 120 and the flange portion 250 which overlap each other in the upward/downward direction.

A through-hole 260 may be formed in the upper portion 210 of the sensor cover 200, and a connector 350 of the wire harness 310 may penetrate the through-hole 260. In the embodiment, the through-hole 260 may be formed at a center of the upper portion 210. In the embodiment, the through-hole 260 may be formed coaxially with a rotation axis about which the sensor cover 200 rotates to be screw-coupled to the sensor accommodation unit 100.

Referring to FIGS. 1 and 4, the wire harness 310 may be coupled to the sensor cover 200 and electrically connected to the sensor installed on the seating portion 110 of the sensor accommodation unit 100. The connector 350 may be disposed at a tip portion of the wire harness 310. The connector 350 passes through the through-hole 260 of the sensor cover 200 and is coupled to the torque sensor 101.

The wire harness 310 may be coupled to the sensor cover 200 by means of a wire cover 320.

In the embodiment, the wire cover 320 may include a first fixing portion 321 fixedly coupled to the sensor cover 200 by means of a coupling member 330, and a second fixing portion 322 configured to couple the wire harness 310 to the first fixing portion 321. In the embodiment, the second fixing portion 322 may be curved in an elbow shape.

Meanwhile, in the embodiment, as illustrated in FIG. 6, the second fixing portion 322 may be rotatably connected to the first fixing portion 321. In this case, the first fixing portion 321 is fixedly coupled to the sensor cover 200 by means of the coupling member 330, whereas the second fixing portion 322 is rotatable relative to the first fixing portion 321. Therefore, the wire harness 310 may not rotate even though the sensor cover 200 rotates during a process in which the sensor cover 200 is screw-coupled to the sensor accommodation unit 100. Therefore, it is possible to prevent the wire harness 310 from being twisted during the assembly process.

Meanwhile, the configuration has been described in which the first screw thread 130 is an internal thread formed on the inner peripheral surface of the wall portion 120 of the sensor accommodation unit 100, and the second screw thread 230 is an external thread formed on the outer peripheral surface of the coupling portion 220 of the sensor cover 200. However, the present disclosure is not limited thereto. That is, as another embodiment, the first screw thread 130 may be an external thread formed on an outer peripheral surface of the wall portion 120, and the second screw thread 230 may be an internal thread formed on an inner peripheral surface of the coupling portion 220.

A process of assembling the torque sensor apparatus according to various embodiments of the present disclosure will be described. In the state in which the connector 350 disposed at the tip portion of the wire harness 310 has passed through the through-hole 260 of the sensor cover 200 and been coupled to the sensor, an operator screw-couples the sensor cover 200 to the sensor accommodation unit 100 and then fixes the wire harness 310 to the sensor cover 200, thereby preventing the wire harness 310 from being twisted.

Meanwhile, in the embodiment, as illustrated in FIG. 6, in the state in which the first fixing portion 321 of the wire cover 320 is fixedly coupled to the sensor cover 200, the operator may couple the connector 350 to the sensor and then screw-couple the sensor cover 200 to the sensor accommodation unit 100. In the embodiment, since the second fixing portion 322, which holds the wire harness 310, is rotatably connected to the first fixing portion 321, it is possible to prevent the wire harness 310 from being twisted even though the wire harness 310 is coupled to the sensor cover 200 first.

As described above, the torque sensor apparatus according to various embodiments of the present disclosure does not require a separate fastening member used to couple the sensor cover 200 to the sensor accommodation unit 100. Therefore, it is possible to simplify the components and reduce the manufacturing cost.

In addition, since the sensor cover 200 is coupled to the sensor accommodation unit 100 in a screw-coupling manner, the manufacturing process may be easily performed, and the manufacturing time may be reduced.

All the constituent elements, which constitute the embodiment of the present disclosure, may be integrally coupled or operate by being combined, but the present disclosure is not necessarily limited to the embodiment. That is, one or more of the constituent elements may be selectively combined and operated within the object of the present disclosure. In addition, unless explicitly described to the contrary, the words "comprise," "include," or "have" and variations such as "comprises," "comprising," "includes," "including," "has," or "having," should be understood to imply the inclusion of stated elements but not the exclusion of any other elements. Unless otherwise defined, all terms including technical or scientific terms may have the same meaning as commonly understood by those skilled in the art to which the present disclosure pertains. The terms such as those defined in a commonly used dictionary may be interpreted as having meanings consistent with meanings in the context of related technologies and may not be interpreted as ideal or excessively formal meanings unless explicitly defined in the present disclosure.

The above description is simply given for illustratively describing the technical spirit of the present disclosure, and those skilled in the art to which the present disclosure pertains will appreciate that various changes and modifications are possible without departing from the essential characteristic of the present disclosure. Therefore, the embodiments disclosed in the present disclosure are provided for illustrative purposes only but not intended to limit the technical concept of the present disclosure. The scope of the technical spirit of the present disclosure is not limited thereby. The protective scope of the present disclosure should be construed based on the following claims, and all the technical spirit in the equivalent scope thereto should be construed as falling within the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A torque sensor apparatus comprising:
    a torque sensor;
    a sensor accommodation unit disposed at one side of a rack housing and having therein a space in which the torque sensor is disposed;
    a sensor cover screw-coupled to the sensor accommodation unit and configured to cover the space; and
    a wire harness coupled to the sensor cover and electrically connected to the sensors,
    wherein
    a through-hole is formed in the sensor cover through which a connector disposed at the tip portion of the wire harness passes,
    the connector of the wire harness passes through the through-hole of the sensor cover and is coupled to the torque sensor,
    the wire harness is coupled to the sensor cover by means of a wire cover, and
    the wire cover includes a first fixing portion fixedly coupled to the sensor cover by means of a coupling member and a second fixing portion rotatably connected to the first fixing portion.

2. The torque sensor apparatus of claim 1, wherein the sensor accommodation unit comprises:
    a seating portion on which the torque sensor is provided; and
    a wall portion protruding along a periphery of the seating portion and configured to define the space, and wherein a first screw thread is formed on the wall portion and screw-coupled to the sensor cover.

3. The torque sensor apparatus of claim 2, wherein the first screw thread is formed on an inner peripheral surface of the wall portion.

4. The torque sensor apparatus of claim 2, wherein the sensor cover has a dome shape and comprises a coupling portion having a second screw thread screw-coupled to the first screw thread.

5. The torque sensor apparatus of claim 4, wherein the second screw thread is formed on an outer peripheral surface of the coupling portion.

6. The torque sensor apparatus of claim 4, wherein the sensor cover comprises a flange portion disposed to overlap an end surface of the wall portion in an upward/downward direction in a state in which the coupling portion is screw-coupled to the wall portion.

7. The torque sensor apparatus of claim 6, comprising:
a sealing member disposed between an upper-end surface of the wall portion and the flange portion.

8. The torque sensor apparatus of claim 2, wherein the seating portion has a pinion hole, and a pinion shaft penetrates the pinion hole.

9. The torque sensor apparatus of claim 1, wherein the through-hole is formed coaxially with a rotation axis about which the sensor cover rotates relative to the sensor accommodation unit.

* * * * *